US011669518B1

(12) United States Patent
Chan et al.

(10) Patent No.: US 11,669,518 B1
(45) Date of Patent: Jun. 6, 2023

(54) METHOD AND SYSTEM FOR PROCESSING DATABASE TRANSACTIONS IN A DISTRIBUTED ONLINE TRANSACTION PROCESSING (OLTP) DATABASE

(71) Applicants: Yuk Kuen Chan, Markham (CA); Ronen Grosman, Markham (CA); Seyyed Mohammad Hadi Sajjadpour, Markham (CA); Hoi Ieng Lao, Markham (CA); Wen Hao Zhang, Scarborough (CA); Chung Yin Alan Wong, Toronto (CA)

(72) Inventors: Yuk Kuen Chan, Markham (CA); Ronen Grosman, Markham (CA); Seyyed Mohammad Hadi Sajjadpour, Markham (CA); Hoi Ieng Lao, Markham (CA); Wen Hao Zhang, Scarborough (CA); Chung Yin Alan Wong, Toronto (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/550,547

(22) Filed: Dec. 14, 2021

(51) Int. Cl.
*G06F 16/23* (2019.01)
*G06F 16/245* (2019.01)

(52) U.S. Cl.
CPC ........ *G06F 16/2379* (2019.01); *G06F 16/245* (2019.01)

(58) Field of Classification Search
CPC ............... G06F 16/2379; G06F 16/245; G06F 16/2453; G06F 16/24556
See application file for complete search history.

(56) References Cited

U.S. PATENT DOCUMENTS 10,810,268 B2    10/2020  Cai et al.
2015/0293966 A1* 10/2015 Cai ................... G06F 16/24532
                                                    707/648

(Continued)

FOREIGN PATENT DOCUMENTS

CN    109189608 A  *  1/2019  .......... G06F 11/1464
CN    114661816 A  *  6/2022

OTHER PUBLICATIONS

Rebecca Taft, Irfan Sharif, Andrei Matei, Nathan VanBenschoten, Jordan Lewis, Tobias Grieger, Kai Niemi, Andy Woods, Anne Birzin, Raphael Poss, Paul Bardea, Amruta Ranade, Ben Darnell, Bram Gruneir, Justin Jaffray, Lucy Zhang, and Peter Matti, CockroachDB: The Resilient Geo-Distributed SQL Database, SIGMOD Conference 2020 Jun. 2020.

(Continued)

*Primary Examiner* — James E Richardson

(57) ABSTRACT

A method and system of processing database transactions in a distributed online transaction processing (OLTP) database is provided. Overhead and network bandwidth associated with a global transaction manager are reduced and scalability improved by determining whether incoming statements are single-shard or multi-shard. For single-shard statements, a local transaction identifier (TXID) stored and associated with a data record reference by the statement is retrieved. The retrieved TXID is compared against a copy of a list of prepared transactions that are pending in a respective data node. If the TXID is in the copy of the prepared list, the statement is caused to await until the previous transaction has been committed or aborted. The visibility of a change committed by the previous is then determined, and the statement is processed.

20 Claims, 7 Drawing Sheets

(56) References Cited

U.S. PATENT DOCUMENTS

2016/0335310 A1* 11/2016 Lahiri ................. G06F 16/2379
2016/0371356 A1* 12/2016 Lee ....................... G06F 16/273
2016/0371358 A1* 12/2016 Lee ..................... G06F 16/2343
2017/0177697 A1*  6/2017 Lee ........................... G06F 1/14
2018/0107703 A1*  4/2018 Sharp ................. G06F 16/2365
2018/0349430 A1* 12/2018 Lee ................... G06F 16/2365

OTHER PUBLICATIONS

Google, Life of Cloud Spanner Reads & Writes, https://cloud.google.com/spanner/docs/whitepapers/life-of-reads-and-writes Dec. 20, 2020.

OceanBase, Database of Databases, https://dbdb.io/db/oceanbase, 4 pages Jun. 27, 2021.

Hillel Avni, Alisher Aliev, Oren Amor, Aharon Avitzur, Ilan Bronshtein, Eli Ginot, Shay, Goikhman, Eliezer Levy, Idan Levy, Fuyang Lu, Liran Mishali, Yeqin Mo, Nir Pachter, D. Sivov, Vinoth Veeraraghavan, Vladi Vexler and Lei Wang, Industrial-strength OLTP using main memory and many cores, Proceedings of the VLDB Endowment, vol. 13, Issue Aug. 12, 2020.

\* cited by examiner

METHOD AND SYSTEM FOR PROCESSING DATABASE TRANSACTIONS IN A DISTRIBUTED ONLINE TRANSACTION PROCESSING (OLTP) DATABASE

RELATED APPLICATION DATA

This is the first patent application related to the instant technology.

TECHNICAL FIELD

The present application relates to database management, in particular to method and system for processing database transactions in a distributed online transaction processing (OLTP) database.

BACKGROUND

The management of transactional data using computer systems is referred to as online transaction processing (OLTP). Transactional data may include records of changes associated with an entity, such as customer payments or inventory changes, are often characterized by large quantities of short online transactions. Consistency and performance are two of the major requirements in most OLTP systems.

Consistency, also known as isolation or visibility, may be defined at database level as a property that defines how or when changes made by one operation (e.g., statement) become visible to other operations (e.g., statements). A lower isolation level increases the ability of users to access the same data at the same time but increases the number of concurrency effects users might encounter. Conversely, a higher isolation level reduces the types of concurrency effects that users may encounter but requires more system resources and increases the chances that one transaction will block another. To address consistency, Multi-Version Concurrency Control (MVCC) is a common concurrency control mechanism that is used in database management systems (DBMSs) of OLTP databases to ensure correct results for concurrent database transactions. Read transactions under MVCC typically use a timestamp or transaction ID to determine the version of the data to be read. This information is generally put into a database snapshot of the database.

A database snapshot is a view of a database at a point in time. A database snapshot is a read-only, static view of the data and the state of the pages of the database at the date-page level. A database snapshot is transactionally consistent with the source database at the time that the database snapshot is generated. A database snapshot includes the original version of data-pages and changes in the source database since the database snapshot was generated; however, the database snapshot is not a full copy of the database.

The performance of OLTP databases is typically assessed using the Transaction Processing Performance Council (TPC) Benchmark C (TPC-C), which is described, for example, at http://www.tpc.org/tpcc/, the content of which is incorporated herein by reference. Performance is reflected in throughput and scalability, among other factors.

There are three main approaches being used to solve the consistency issue for distributed database systems: (1) hybrid logical clock; (2) truetime services; and (3) centralization. The hybrid logical clock solution is a comparatively complicated approach that requires synchronization by using a timestamp/counter along with a message exchange. Performance may be impacted by the synchronization infrastructure. This approach is adopted by Oracle® and CockroachDB® among others. The truetime services solution is an approach adopted by Google® that requires special hardware support. Performance is heavily dependent on the quality of time synchronization infrastructure. The centralization solution is a more commonly adopted approach that may be found in OLTP systems including Amazon Aurora®, PostgreSQL®, Alibaba® and Oceanbase® etc. The approach utilizes a centralized server for consistency management. Hence, the database performance will be heavily determined by the network bandwidth with the centralized server (or node) itself.

A centralization approach based OLTP DBMS may include at least one coordinator node which serves as the primary contact point for a client to the database, at least one data node where data is stored, and a central management node (or central node) for maintaining consistency between the different data nodes known as a global transaction manager (GTM) or GTM node. In a distributed OLTP DBMS, achieving both high performance and consistency may be a difficult challenge given that a higher consistency (also known as isolation level) results in lower performance, and vice versa.

For at least the reasons given above, it is desirable to provide improvements in processing database transactions in a distributed OLTP database.

SUMMARY

The present disclosure provides a method, device, system and media for a distributed OLTP, namely for processing database transactions in a distributed OLTP database, that seeks to achieve high performance while maintaining strong isolation (consistency). The technical solution of the present invention may be exemplarily embodied by a database engine of a database management system (DBMS) of an OLTP system. Conventional OLTP systems comprise a global transaction manager (GTM). The GTM is a central node that ensures a globally (i.e., across the entire system) consistent view or database snapshot through the synchronization of distribution transactions in the OLTP system. The present disclosure provides a solution which seeks to reduce system communication traffic to the GTM by reducing the functionality of the GTM. The present disclosure provides methods and systems for an OLTP system, referred to as GTM-Lite, that adopts a hybrid database snapshot approach to advantageously provide relatively high levels of isolation (consistency) while maintaining relatively high-speed performance. A local database snapshot is used for single-node transactions (i.e., single-shard statements) and a global database snapshot is used for multi-node transactions (i.e., multi-shard statements). Transaction management and generation of single-shard statements is offloaded from the centralized GTM server. A monotonically increasing Commit Sequence Number (CSN) is maintained by the OLTP system. The CSN uniquely identifies an order in which a transaction is committed to the database and can be used in subsequent transactions to determine the order of committed transactions for MVCC visibility checking and the like. The GTM-Lite system of the present disclosure is between a conventional (or full) GTM mode and a GTM-free mode in terms of control and operational load of the GTM. The OLTP system described herein meets the RC level isolation for SELECT statements. In some embodiments of the GTM-Lite system of the present disclosure, centralized concurrency control by the GTM is removed for single-shard read statements (such as single-shard SELECT statements), thus allowing such statements to be executed more quickly. Centralized concurrency control by the GTM is maintained for multi-shard statements, such as multi-shard write statements having a two-phase commit protocol. Thus, the technical solution of the present invention improves the functioning of the OLTP system, namely, by improving the processing of database transactions of the OLTP system.

In accordance with a first aspect of the present disclosure, there is provided a method of processing database transactions, the method comprising: receiving, at a coordinator node, a query for a transaction comprising one or more statements; at a data node comprising one or more data records referenced in a single-shard read statement in the transaction: receiving, from the coordinator node, the single-shard read statement; generating a local database snapshot and a copy of a prepared list, wherein the prepared list comprises a list of transactions having one or more multi-shard write statements that have been prepared but not been committed, wherein transactions in the prepared list are identified by a respective local transaction identifier (TXID); determining, for each data record in the one or more data records, a TXID of a previous transaction associated with each data record in the one or more data records referenced in the single-shard read statement; determining, for each data record in the one or more data records, whether a transaction associated the data record is present in the copy of the prepared list by comparing the TXID of the previous transaction to the TXIDs in the copy of the prepared list to determine if a match exists; responsive to a determination that one or more data records in referenced in the single-shard read statement are present in the copy of the prepared list, causing the single-shard read statement to await processing until all matching transactions identified in the prepared list are either committed or aborted; determining a visibility of one or more committed changes to the one or more data records referenced in the single-shard read statement upon all matching the transactions identified in the prepared list being either committed or aborted; and processing the single-shard read statement based on the determined visibility of the one or more committed changes to the one or more data records referenced in the single-shard read statement.

In some or all examples of the first aspect, the method further comprises: responsive to a determination that one or more data records referenced in the single-shard read statement are not present in the copy of the prepared list transactions, allowing the single-shard read statement to be processed.

In some or all examples of the first aspect, the method further comprises: responsive to a determination that one or more data records referenced in the statement are not present in the copy of the prepared list, processing the single-shard read statement.

In some or all examples of the first aspect, the single-shard read statement is one of a single-shard SELECT statement or a single-shard QUERY statement.

In some or all examples of the first aspect, determining the visibility comprises: comparing a local database snapshot Commit Sequence Number (CSN) against a CSN of the corresponding transaction identified in the copy of the prepared list; wherein the one or more committed changes to the one or more data records in the one or more data records referenced in the single-shard read statement are made visible when the CSN of the corresponding transaction identified in the copy of the prepared list is less than the local database snapshot CSN; wherein the one or more committed changes to the one or more data records in the one or more data records referenced in the single-shard read statement are made invisible when the CSN of the corresponding transaction identified in the copy of the prepared list is greater than the local database snapshot CSN.

In some or all examples of the first aspect, the method further comprises: at a data node comprising one or more data records referenced in a single-shard write statement in the transaction: receiving the single-shard write statement from the coordinator node; receiving a global database snapshot from the coordinator node; and processing the single-shard write statement.

In some or all examples of the first aspect, the method further comprises: at the data node comprising one or more data records referenced in the single-shard write statement in the transaction: generating a TXID for the transaction responsive to the single-shard write statement being a first write statement in the transaction.

In some or all examples of the first aspect, the single-shard write statement is one of an INSERT statement, UPDATE statement or DELETE statement.

In some or all examples of the first aspect, the method further comprises: at a data node comprising one or more data records referenced in a multi-shard read statement in the transaction: receiving the multi-shard read statement from the coordinator node; receiving a global database snapshot from the coordinator node; determining a visibility of one or more committed changes to the one or more data records referenced in the multi-shard read statement; and processing the multi-shard read statement based on the determined visibility of the one or more committed changes to the one or more data records referenced in the multi-shard read statement.

In some or all examples of the first aspect, determining the visibility of one or more committed changes to the one or more data records referenced in the multi-shard read statement comprises: comparing a global database snapshot CSN against a CSN of the corresponding transaction identified in the copy of the prepared list; wherein the one or more committed changes to the one or more data records in the one or more data records referenced in the multi-shard read statement are made visible when the CSN of the corresponding transaction for the data record is less than the global database snapshot CSN; wherein the one or more committed changes to the one or more data records in the one or more data records referenced in the multi-shard read statement are made invisible when the CSN of the corresponding transaction for the data record is greater than the global database snapshot CSN.

In some or all examples of the first aspect, the multi-shard statement read statement is one of a multi-shard SELECT statement or a multi-shard QUERY statement.

In some or all examples of the first aspect, the method further comprises: at a data node comprising one or more data records referenced in a multi-shard write statement in the transaction: receiving the multi-shard write statement from the coordinator node; receiving a global database snapshot from the coordinator node; and processing the multi-shard read statement.

In some or all examples of the first aspect, the method of claim 12, further comprising: at the data node comprising one or more data records referenced in the multi-shard write statement in the transaction: generating a TXID for the transaction responsive to the multi-shard write statement being a first write statement in the transaction.

In some or all examples of the first aspect, the method further comprises: responsive to the transaction being a multi-shard write transaction: after the last read or write statement in the multi-shard write transaction has been processed, performing a two-phase COMMIT process comprising: at the data node comprising one or more data records referenced in the multi-shard write statement in the multi-shard write transaction: receiving a PREPARE TO COMMIT statement from the coordinator node; appending the prepared list with the TXID for the transaction responsive to receiving the PREPARE TO COMMIT statement; processing the PREPARE TO COMMIT statement; receiving, from the coordinator node, a COMMIT statement and a global transaction identifier (GXID) for the transaction and a CSN for the transaction; removing the TXID from the prepared list responsive to receiving the COMMIT statement; and processing the COMMIT statement.

In some or all examples of the first aspect, the multi-shard write statement is one of a multi-shard INSERT statement, multi-shard UPDATE statement or multi-shard DELETE statement.

In some or all examples of the first aspect, the method further comprises: responsive to the transaction being a single-shard write transaction: after the last read or write statement in the single-shard write transaction has been processed, performing a one-phase COMMIT process comprising: at the data node comprising one or more data records referenced in the single-shard write statement in the single-shard write transaction: receiving, from the coordinator node, a COMMIT statement and a CSN for the transaction; and processing the COMMIT statement.

In some or all examples of the first aspect, the database transaction relates to an online transaction processing (OLTP) database of an OLTP database management system (DBMS).

In some or all examples of the first aspect, the OLTP DBMA has a two-phase commit protocol for multi-shard write statements, the two-phase commit protocol comprising a prepare phase which uses a PREPARE TO COMMIT statement as a first phase and a commit phase which uses a COMMIT statement as a second phase.

In accordance with a further aspect of the present disclosure, there is provided a computing device (e.g., data node) comprising one or more processors, a memory and a communication subsystem. The memory having tangibly stored thereon executable instructions for execution by the one or more processors. The executable instructions, responsive to execution by the one or more processors, cause the computing device to perform the methods described above and herein.

In accordance with a further aspect of the present disclosure, there is provided a non-transitory machine-readable medium having tangibly stored thereon executable instructions for execution by one or more processors of a computing device (e.g., data node). The executable instructions, responsive to execution by the one or more processors, cause the computing device to perform the methods described above and herein.

Other aspects and features of the present disclosure will become apparent to those of ordinary skill in the art upon review of the following description of specific implementations of the application in conjunction with the accompanying figures.

DETAILED DESCRIPTION OF EXAMPLE EMBODIMENTS

Figure 1:
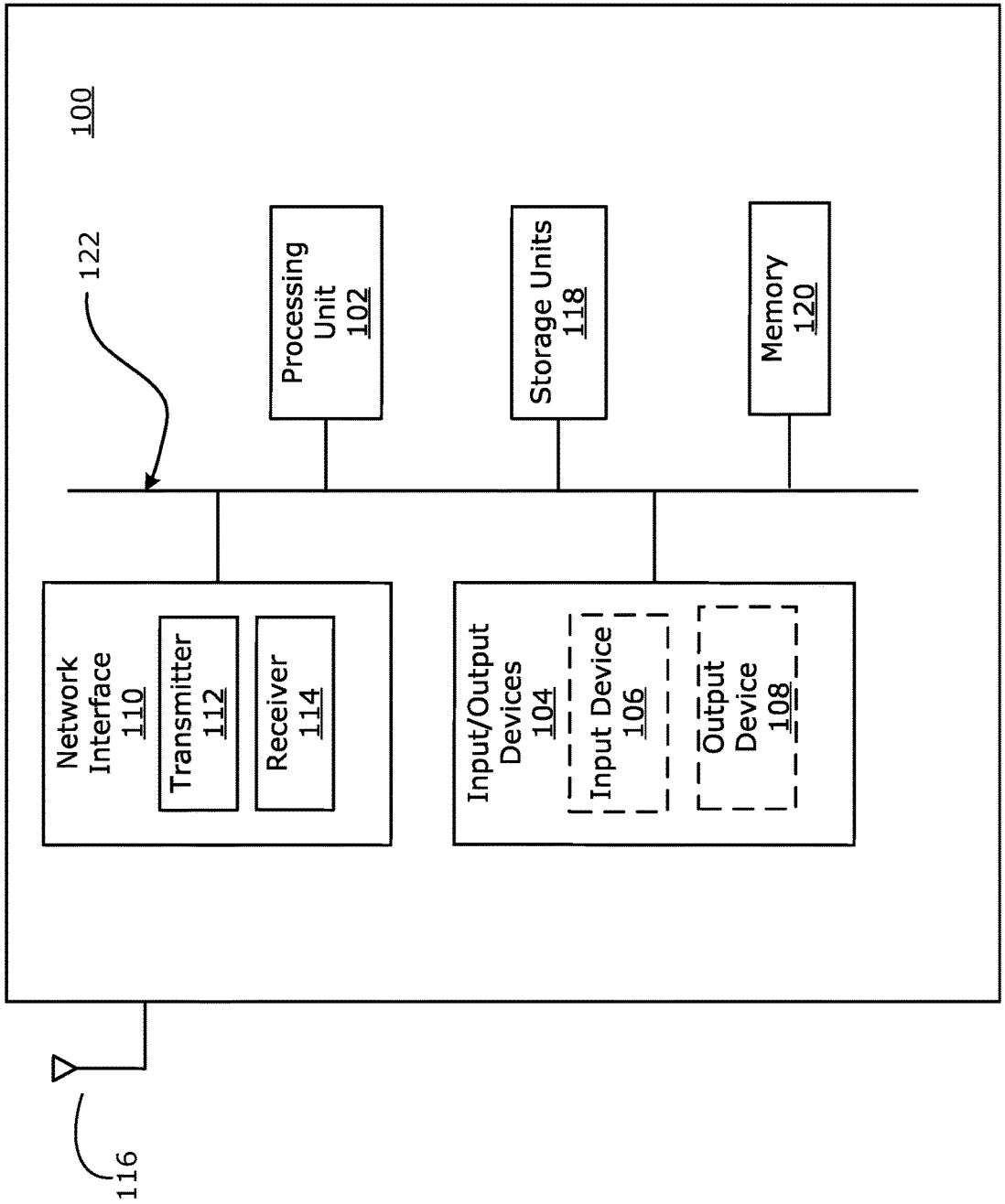
FIG. 1 is a simplified block diagram of a computing device which may be used to implement exemplary embodiments of the present disclosure.

The present disclosure is made with reference to the accompanying drawings, in which embodiments are shown. However, many different embodiments may be used, and thus the description should not be construed as limited to the embodiments set forth herein. Rather, these embodiments are provided so that this application will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

Within the present disclosure, the following sets of terms are used interchangeably: server and node; and client and client device.

In this disclosure, a DBMS can refer to a database instance, which is a set of software implemented memory structures that are used to manipulate data in a database. A database can refer to a set of files that store data and metadata. In some examples, database files may be written to a persistent read/write storage such as a disc storage. A DBMS (e.g., database instance) may be implemented by a combination of a computing device and non-transitory machine-readable medium having tangibly stored thereon machine-readable instructions executable on the computing device. In some examples, the DBMS may be hosted by a single computing device such as a computer. In some other examples, a DBMS may be hosted by a plurality of computing devices. In some further examples, multiple DBMSs may be hosted on a single computing device.

A database receives transactions from users/clients. A database transaction refers to a logical, atomic unit of work that is independently executed for data retrieval or updates. A database transaction may include one or more statements (also known as operations, commands, requests or actions) that each reference one or more data records of a database to access those records. A statement can be one of two types: a read statement or a write statement. SELECT and QUERY are examples of a read statement. INSERT, UPDATE and DELETE are examples of a write statement. Examples of actions that can be performed by a statement include store (i.e., INSERT), modify (i.e., UPDATE), delete (i.e., DELETE), and retrieve (i.e., SELECT or QUERY) data. The one or more data records reference by each statement may be located in one or more data nodes. Thus, each statement can be a single-node statement n or multi-node statement, and each transaction can be a single-node transaction or multi-node transaction.

When a transaction includes multiple statements, the series of statements in the transaction are indivisible and irreducible. Each statement in a database transaction must all be committed (e.g., completed and saved) and in the order that the statements appear in the database transaction or else the transaction is aborted and any changes made by the statements in the transaction are rolled back.

Each statement has a corresponding database snapshot which is maintained even after the statement has been processed. Each database snapshot includes a CSN. The CSN is used for MVCC visibility checking and the like.

To achieve scalability, distributed OLTP systems often utilize a database that divides data into shards or partitions based on a hash value or a range of a distribution column. The data shards are distributed to database nodes (servers) and each node manages its own data independently of other data nodes. The throughput of the overall system is increased as the number of servers and nodes increases since each database shard or node contains less data and may be capable of handling more concurrent data queries.

In some conventional OLTP systems, the synchronization of distribution transactions in the system is achieved using the GTM. As noted above, the GTM is a central node that ensures a globally (i.e., across the entire system) consistent view or database snapshot coupled with a two-phase commit protocol for multi-shard write transactions that provides consistent write transactions across data nodes. The two-phase commit protocol comprises a prepare phase which uses a PREPARE TO COMMIT statement (also known as a PREPARE command) as the first phase and a commit phase which uses a COMMIT statement as the second phase. Single-shard write transactions are one-phase and do not involve a PREPARE TO COMMIT statement—only the COMMIT statement of the second phase. The GTM in conventional OLTP systems also generates the CSN responsive to requests by CNs. The CNs request CSNs when processing write transactions. The GTM may also generate transaction numbers, which is monotonically increasing and is indicative of the ordering of transactions. The globally consistent database snapshot, or global database snapshot, from the GTM includes a CSN and transaction status for each transaction in the global database among other data for each transaction. The transaction status is one of ACTIVE, PREPARE TO COMMIT, COMMITTED or ABORTED. The CSN and transaction status are used to handle consistency, in other words, to determine whether or not a database table/relation tuple is visible. As noted above, visibility refers to whether data is visible to other statements, transactions or users. As an example, if a transaction has inserted data but has not yet committed the inserted data, the inserted data will not be visible to previous transactions. Conversely, if a transaction that modifies data has been committed, the changed will be visible to previous transactions. This centralized approach supports MVCC by ensuring strong isolation. For example, a centralized OLTP system implemented in PostgreSQL meets the Read Committed (RC) isolation level. However, the GTM approach requires multiple communications between nodes and the GTM, thus bandwidth of the communication link with the GTM may become a bottleneck, thus degrading system performance in terms of system throughput and hence speed.

Other conventional OLTP systems operate under a GTM-free mode that does not utilize a GTM or central node to process statements and synchronize distribution transactions in the system. Under the GTM-free mode, each database statement is associated to one or more data nodes (DNs) and is processed locally by the DNs. A DN is associated with the statement if the DN contains a data record requested by the statement. The GTM-free mode uses local database snapshots in processing database statements. A local database snapshot is similar to a global database snapshot but includes only the transactions for a given DN among other data for each transaction. The local database snapshot includes the CSN generated and assigned by the DN and the transaction status for each transaction in the local database. The GTM-free mode can achieve faster performance as the communication with the central node or GTM is reduced. The GTM-free mode may be preferred if applications only access data in an individual server (or data node). However, for transactions involve multiple data nodes, networking and synchronization introduce overhead that can degrade performance considerably. In addition, the GTM-free mode may provide low isolation level or inconsistency. For example, the GTM-free mode fails to meet the RC isolation level as in PostgreSQL. The RC isolation level is defined as a state in which a SELECT statement sees only data committed before the request began and does not see either uncommitted data or changes committed during request execution by concurrent transactions. Hence, in multi-shard situations, a statement, without benefit of a global database snapshot may not be aware of other concurrent statement. This may lead to situations where a multi-shard statement correctly reading data from one DN yet failing to correctly read data from a different DN where both data stem from single-shard statements.

FIG. 1 is a simplified block diagram of a computing device 100 which may be used to implement methods and systems described herein. Other computing devices suitable for implementing the present invention may be used, which may include components different from those discussed below. In some example embodiments, the computing device 100 may be implemented across more than one physical hardware unit, such as in a parallel computing, distributed computing, virtual server, or cloud computing configuration. Although FIG. 1 shows a single instance of each component, there may be multiple instances of each component in the computing device 100.

The computing device 100 may include one or more processing unit(s) ("processors") 102, such as a central processing unit (CPU) with an optional hardware accelerator, a graphics processing unit (GPU), a tensor processing unit (TPU), a neural processing unit (NPU), a microprocessor, an application-specific integrated circuit (ASIC), a field-programmable gate array (FPGA), a dedicated logic circuitry, a dedicated artificial intelligence processor unit, or combinations thereof.

The computing device 100 may also include one or more input/output (I/O) interfaces 104, which may enable interfacing with one or more appropriate input devices 106 and/or output devices 108. In the example shown, the input device(s) 106 (e.g., a keyboard, a mouse, a microphone, a touchscreen, and/or a keypad) and output device(s) 108 (e.g., a display, a speaker and/or a printer) are shown as optional and external to the computing device 100. In other examples, one or more of the input device(s) 106 and/or the output device(s) 108 may be included as a component of the computing device 100. In other examples, there may not be any input device(s) 106 and output device(s) 108, in which case the I/O interface(s) 104 may not be needed.

The computing device 100 may include one or more network interfaces 110 for wired or wireless communication with a network. In example embodiments, network interfaces 110 include one or more wireless interfaces such as transmitters 112 that enable communications in a network. The network interface(s) 110 may include interfaces for wired links (e.g., Ethernet cable) and/or wireless links (e.g., one or more radio frequency links) for intra-network and/or inter-network communications. The network interface(s) 110 may provide wireless communication via one or more transmitters 112 or transmitting antennas, one or more receivers 114 or receiving antennas, and various signal processing hardware and software. In this regard, some network interface(s) 110 may include respective computing systems that are similar to computing device 100. In this example, a single antenna 116 is shown, which may serve as both transmitting and receiving antenna. However, in other examples there may be separate antennas for transmitting and receiving.

The computing device 100 may also include one or more storage devices such as storage units 118, which may include a non-transitory storage unit such as a solid state drive, a hard disk drive, a magnetic disk drive and/or an optical disk drive. The storage devices of computing device 100 may include one or more memories 120, which may include a volatile or non-volatile memory (e.g., a flash memory, a random access memory (RAM), and/or a read-only memory (ROM)). The storage devices (e.g., storage units 118 and/or non-transitory memory(ies) 120) may store instructions for execution by the processing units(s) 102, such as to carry out the present disclosure. The memory(ies) 120 may include other software instructions, such as for implementing an operating system or a DBMS disclosed herein and other applications/functions.

In some examples, one or more data sets and/or module(s) may be provided by an external memory (e.g., an external drive in wired or wireless communication with the computing device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

There may be a bus 122 providing communication among components of the computing device 100, including the processing units(s) 102, I/O interface(s) 104, network interface(s) 110, storage unit(s) 118, memory(ies) 120. The bus 122 may be any suitable bus architecture including, for example, a memory bus, a peripheral bus or a video bus.

Figure 2:
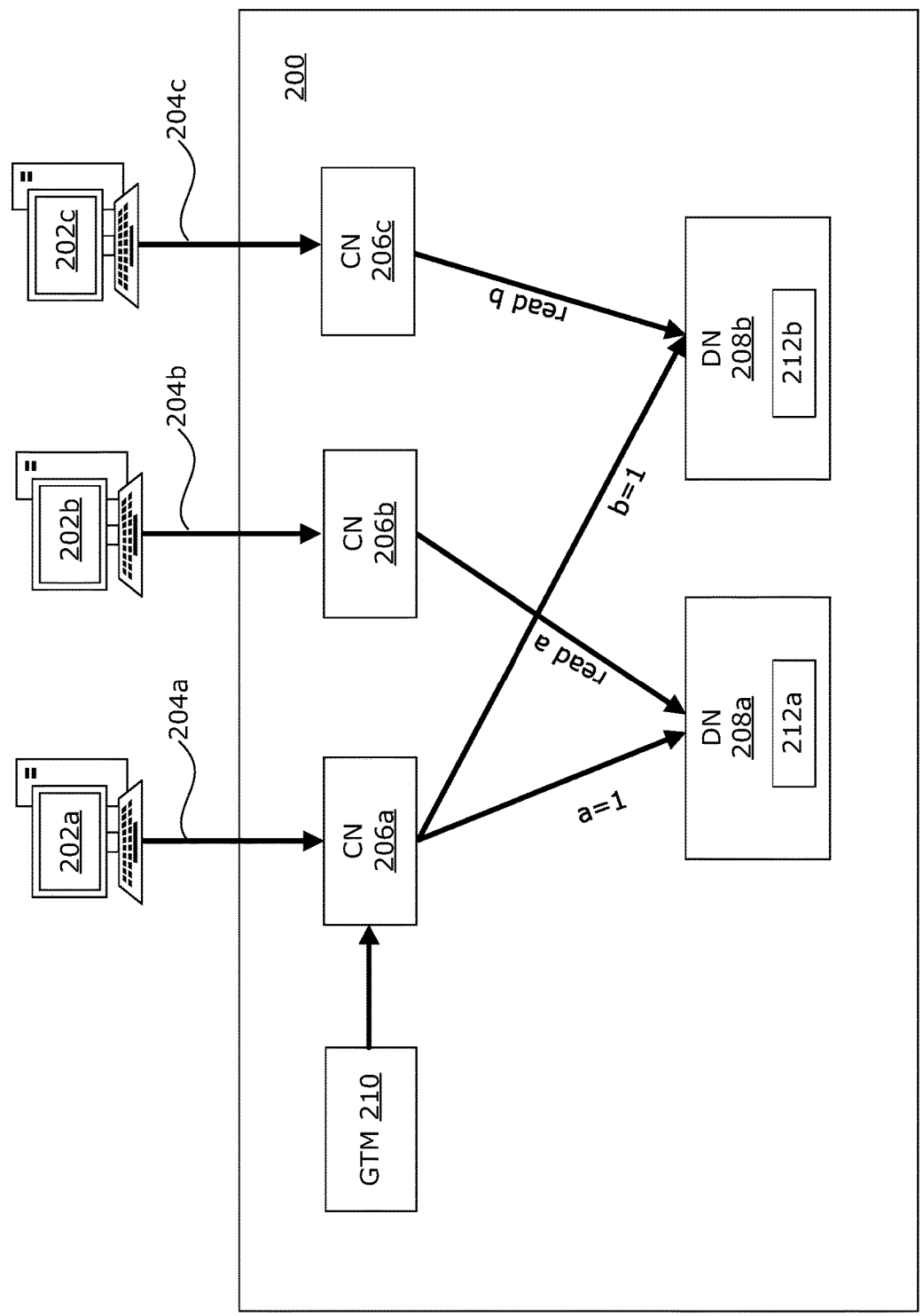
FIG. 2 illustrates an OLTP system in accordance with an example embodiment of the present disclosure.

FIG. 2 illustrates an OLTP system 200 in accordance with an example embodiment of the present disclosure. The OLTP system 200 implements a centralization approach using hybrid database snapshots for MVCC. The OLTP system 200 may be a distributed OLTP system with data arranged in shards. A plurality of user applications 202a, 202b, and 202c (collectively referred to as user applications 202) interact with OLTP system 200 by sending transactions 204a, 204b, and 204c (collectively referred to as transactions 204) to one of the corresponding coordinator nodes (CN) 206a, 206b, and 206c (collectively referred to as CNs 206) tasked with processing each transaction 204. A transaction 204 may include one or more statements that may each be a write or read statement. Each CN 206 interprets the received transaction 204 and determines which database shards or data nodes (DN) 208a and 208b (collectively referred to using reference number 208) are referenced by each of the statements in a transaction 204. The CN 206 is configured to forward statements to the referenced DNs 208 for processing. The CNs 206 are in communication with a GTM 210. The GTM 210 is configured in a GMT-Lite mode in accordance with embodiments of the present disclosure for processing multi-shard statements as discussed in more detail below.

Each CN 206 is configured to generate a global transaction identifier (GXID) for each received write transaction—a task conventionally performed by the GTM. For a multi-shard write transaction, the CN 206 is configured to generate the GXID at the commit phase of the multi-shard write transaction. The CN 206 forwards the GXID to each of the one or more DNs 208 that are referenced by the multi-shard write transaction.

The GXID is unique in the OLTP system 200 so that each transaction is uniquely identified within the OLTP system 200. The GXID may be in ascending order such as a monotonically increasing identifier. The GXID may indicate the order of transaction priority. The GXID may include a first portion comprised of the CN 206 identifier that is unique system-wide and a second portion comprised of an identifier generated locally by the CN 206. Because the CN 206 forwards the GXID to each of the DNs 208 referenced by a multi-shard write transaction, the CN 206 no longer needs to request transaction identifiers from the GTM, thereby reducing network bandwidth. Each CN 206 shares the GXIDs with all other CNs 206 within the OLTP system 200 without the involvement of the GTM 210 to ensure that the GXID is globally unique in the OLTP system 200

Each DN 208 generates and assigns a local transaction identifier (TXID) for each write transaction. Responsive to committing a change to a data record, the TXID of the transaction that committed the change is stored, or associated with, the particular data record in the local database of the DN 208. The local nature of the TXID means that the TXID is not unique within the OLTP system 200 and a TXID may be duplicated in one or more DNs 208. The DN 208 also generates a CSN responsive to commitment of a transaction. A transaction is committed when all statements in the transaction are committed. The DN 208 maintains a first local mapping or the logical table between the CSN and the TXIDs for data records stored in the respective DN 208.

It will be appreciated that each multi-shard write transaction is associated both with a TXID and a GXID whereas each single-shard write transaction is associated with a TXID only. Each DN 208 maintains a second local mapping between the TXID and the corresponding GXID for data records stored in the respective DN 208.

The first and second local mappings are stored, for example, in a log file. The first and second local mappings may be combined in some embodiments. The first and second local mappings may be used during visibility checking to determine the order of transactions. The mapping may also be used for data recovery purposes in the event of a crash or the like.

Each DN 208 also maintains a list of prepared transactions for the respective DN 208 that have not yet been committed. The list of prepared transactions is used to address visibility issues that arise as the result of mixed global and local database snapshot usage or other reasons, as more fully described below. The list of prepared transactions comprises pending transactions comprising one or more multi-shard write transactions. Each pending transaction in the list of prepared transactions is identified by a respective TXID. The list of a prepared transactions is also referred to as a prepared list for convenience. A pending transaction is added to the prepared list by the respective DN 208 responsive to receiving a corresponding PREPARE TO COMMIT statement by the CN 206. As noted above, the PREPARE TO COMMIT statement is sent by the CN 206 for a multi-shard write transaction referencing one or more data records contained in the DN 208. The PREPARE TO COMMIT statement is the first phase of a two-phase commit protocol used for multi-shard write transactions.

The GTM 210 is configured to generate a CSN for write transactions comprising one or more write statements such as UPDATE, DELETE, and/or INSERT statements. The GTM 210 is also configured to respond to requesting nodes with a global database snapshot that includes the transaction having the latest CSN generated by the GTM 210. The global database snapshot may be used to support MVCC to achieve high isolation by allowing read transactions without blocking write transactions and allowing write transactions without blocking read transactions. In some embodiments, responsive to a data record being updated by a write statement, it is not replaced by updates. Instead, a new version of the record is generated. Both old and new versions may coexist in the system so that read transactions and write transaction of the same record do not block each other (i.e., isolated from one another, hence the term isolation). Transactions having a global database snapshot may access the correct version of the requested data based by comparing the latest CSN in the global database snapshot with the CSN of the transaction responsible for the update. The corresponding committed changes are visible to the current transaction when the updating transaction (i.e., UPDATE, DELETE or INSERT statement) has an earlier (or lower) CSN than the CSN of the current transaction.

In addition to processing single-shard read statements with decreased system communication traffic, the OLTP system 200 is configured to process single-shard write statements with decreased system communication traffic due to reduced functionality of the GTM in accordance with the present disclosure.

Instead of fully relying on global database snapshot for high isolation levels, the hybrid database snapshot approach described herein processes single-shard statements using local database snapshots. The differences in messaging communication between the two approaches are better shown in FIG. 3 and FIG. 4, which illustrate the sequence diagrams of processing a single-shard statement SELECT statement after a single-shard INSERT statement using conventional GTM mode processing and GTM-Lite mode processing in accordance with the present disclosure, respectively.

Processing of Read Statements

When a transaction comprising a single-shard read statement (such as a SELECT or QUERY statement) referencing one or more data records is received by a CN 206, the statement is forwarded by the CN 206 to a DN 208 associated with the one or more data records. When the associated DN 208 receives the read statement, the DN 208 generates a local database snapshot. The DN 208 then determines a latest known CSN in the DN 208 from the local database snapshot and determines the TXIDs associated with the latest known CSN.

The DN 208 then generates a copy of the prepared list. Unlike the prepared list itself, the copy of the prepared list is not updated. The copy of the prepared list is static and identifies the pending transactions with earlier priority than the current transaction. When a data record is being examined, the DN 208 checks the TXID of the data record to determine whether it is in the copy of the prepared list by comparing the TXID against the TXIDs in the copy of the prepared list to determine if a match is found. Any transactions added to the prepared list after the current transaction was received by the DN 208 will not appear in the copy of the prepared list since the subsequent transactions have later priority and any potential committed changes are not visible to the current transaction.

It will be appreciated that a transaction that inserts or deletes a data record will write the corresponding TXID directly into the data record. To determine whether a previous transaction references a data record referenced by the current transaction, the reference data record is read by the current transaction. If the TXID of a previous transaction references a data record that is also referenced by the current transaction matches any of the TXIDs in the copy of the prepared list, the current transaction is caused to wait (e.g., it is temporarily suspended or slept) until the previous transaction in the copy of the prepared list that is also accessing the same data record has been either committed or aborted. The transaction will wait until signalled to waken. A number of different approaches can be used to determine when the previous transaction has been either committed or aborted and wake the transaction. For example, a locking protocol may lock the transaction from further processing until the previous transaction in the copy of the prepared list has been either committed or aborted, and when the previous transaction in the copy of the prepared list has been either committed or aborted, release the lock and so the further processing of the waited transaction can continue. A listener or watcher may be used by the DN 208 to determine when the transaction status of the previous transaction in the local database snapshot is updated to committed or aborted.

After the previous transaction has been either committed or aborted, the DN 208 determines the visibility of any changes committed by the previous transaction associated with the data record to the current transaction. In some embodiments, the DN 208 compares a local database snapshot CSN associated with the current transaction against a local database snapshot CSN of the previous transaction associated with the data record (i.e., the transaction that last modified the data record). A CSN of a transaction in the local database snapshot is referred to as a local database snapshot CSN. As the CSNs are generated as monotonically increasing identifiers, a smaller or lower CSN value is indicative of an earlier priority transaction. Thus, responsive to the previous transaction associated with the data record having a lower database snapshot CSN value, the change in the data record that was committed by the previous transaction is made visible to the current transaction, the current transaction is allowed to proceed and the current transaction is processed. The visible data records are returned to the client 202. Alternatively, if the local database snapshot CSN value of the previous transaction associated the data record is of a higher value, the change to the data record is made invisible to the current transaction.

If the TXID of a previous transaction associated with any data record in the current transaction does not match any of the TXIDs in the copy of the prepared list, the current transaction is allowed to proceed and the current transaction is processed.

Multi-shard read statements are processed in a manner similar to single-shard read statements with the following differences. A copy of the prepared list is not prepared or considered as with a single-shard read statement. The CN 206 requests and obtains global database snapshots from the GTM 210 and forwards the global database snapshots to the DN 208 which performs the determination of the visibility of committed changes is performed by comparing the global database snapshot CSN associated with the current transaction against a global database snapshot CSN of the previous transaction associated with the data record. Should the global database snapshot CSN associated with the current transaction be of a higher value, in other words later priority, the previously committed change is made visible to the current transaction. If not, the previously committed change is made invisible to the current transaction.

Issues that may arise from duplicated TXIDs are prevented by the association with the GXID. Referring to FIG. 2, a user application 202a sends a transaction 204a including a multi-shard write statement (or a distributed statement) to CN 206a. The multi-shard write statement in the transaction 204a attempts to commit value updates of variables a and b in DNs 208a and 208b, respectively, to 1. Once the change is committed, the TXID of transaction 204a is stored (or associated) with data record a. The CN 206a is configured to generate and manage a GXID for the transaction during the commit phase. Each of DN 208a and DN 208b generate a respective TXID for the transaction 204a. The two TXIDs for transaction 204a in DNs 208a and 208b may be identical or may be different from one another. The TXIDs are both associated with the same transaction 204a through the GXID as managed by CN 206a. As noted above, each of the DNs 208a and 208b records and maintains a local mapping between the received GXID and the locally generated TXID assigned to the transaction 204a into a log file. The CN 206a is also responsible for requesting a global database snapshot from the GTM 210 for multi-shard write statements. The assigned TXID is stored, or associated, with the data record modified by the multi-shard write statement.

As shown in FIG. 2, DN 208a maintains a prepared list 212a and DN 208b maintains a prepared list 212b. Upon receiving a PREPARE TO COMMIT statement of the two-phase commit protocol for multi-shard write transactions from transaction 204a, the TXID of transaction 204a is added to the prepared lists 212a and 212b of DN 208a and 208b, respectively. In the example shown in FIG. 2, each of DN 208a and 208b further receive a single-shard read statements from transactions 204b and 204c, respectively. The read statement from transaction 204b is attempting to query the value of variable a. Responsive to the single-shard read statement from transaction 204b being received at DN 208a, a copy of the prepared list 212a is generated. The TXID associated with data record a, which in this case is the TXID assigned to transaction 204a by DN 208a, is determined (e.g., retrieved) and compared against those in the copy of the prepared list. If a match is found (i.e., the TXID of transaction 204a is found within the copy of the prepared list), it implies that the transaction 204a has yet to be committed and the current statement from transaction 204b is caused to wait until the commitment of the statement from transaction 204a to determine the visibility of the change committed by the write statement from transaction 204a.

Although each of transactions 204a, 204b and 204c are described as having a single statement, it is understood that each of the transactions 204a, 204b and 204c is capable of comprising two or more statements.

Processing of Write Statements

When a transaction comprising a single-shard write statement (such as an UPDATE, DELETE or INSERT statement) referencing one or more data records is received by a CN 206, the CN 206 will forward the statement to the associated DN 208. The DN 208 will generate a local database snapshot and will generate TXID for the current transaction when it is the first write statement in the transaction. The DN 208 then receives and processes the single-shard write statement. At commit time of the corresponding transaction, the CN 206 responsible for processing the transaction requests a CSN from the GTM 210. The GTM 210 then returns a CSN to the CN 206. The CN 206 then sends a COMMIT statement and the CSN to the DN 208, which receives and processes the COMMIT statement. Commit processing is described more fully below in connection with FIGS. 6A, 6B and 6C.

Multi-shard write statements are processed in a manner similar to single-shard write statements with the following differences. The CN 206 obtains a global database snapshot from the GTM 210. The CN 206 forwards the multi-shard write statement and the global database snapshot to each respective DN 208, which receives and then processes the multi-shard write statement. At commit time of the corresponding transaction, a GXID will be generated for the multi-shard write transaction, as described more fully below in connection with FIGS. 6A, 6B and 6C.

Figure 3:
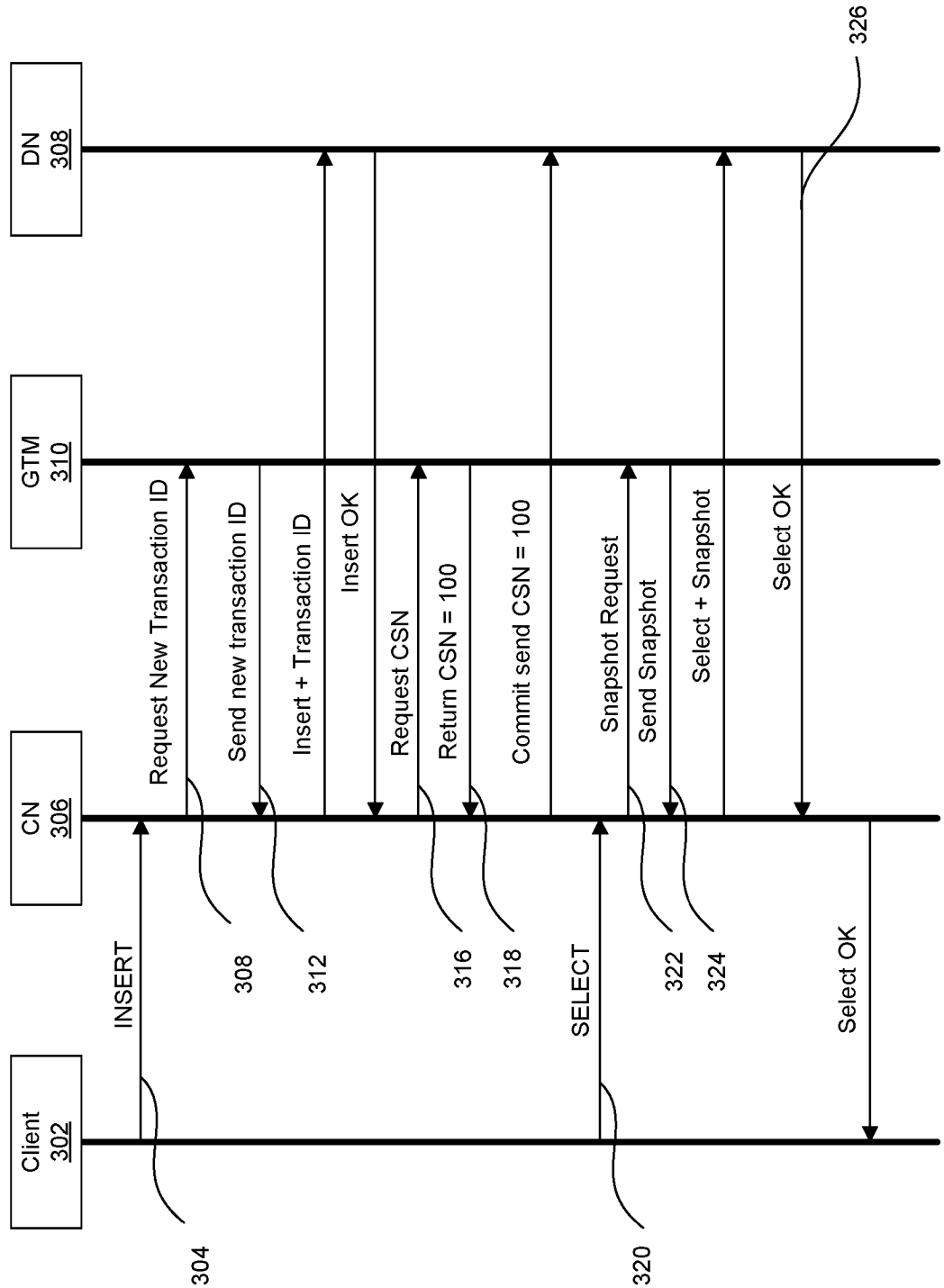
FIG. 3 illustrates a sequence diagram of processing single-shard transaction using a global database snapshot using an OLTP system having a GTM configured in a conventional (or full) GTM mode.

FIG. 3 illustrates a sequence diagram of an OLTP system having a GTM configured in a conventional GTM mode processing a single-shard statement SELECT statement after a single-shard INSERT statement. As shown in FIG. 3, client 302 sends a transaction 304 comprising an INSERT statement to CN 306. Upon receiving transaction 304, CN 306 proceeds to send a request 308 to the GTM 310 requesting for a new transaction identifier (ID). In response, the GTM 310 generates the requested transaction ID, and sends it to the CN 304 in response 312. The CN 306, having determined the statement from transaction 304 is a single-shard INSERT statement with one associated DN 314, forwards the transaction 304 to the DN 314. Responsive to the CN 306 receiving a readiness confirmation from the DN 314, the CN 306 contacts the GTM 310 with a request 316 for a CSN to commit the transaction. The GTM 310 then assigns a CSN with a value of 100. The assigned CSN value of 100 is sent to the CN 306 from the GTM 310 in response 318. With the CSN assigned, the CN 306 commits the change (e.g., the data contained in the INSERT statement) to the DN 314 with the corresponding CSN. Subsequently, a subsequent transaction 320 including a SELECT statement is received by the CN 306. The CN 306 requests a global database snapshot from the GTM 310 in request 322, which it receives from the GTM 310 in response 324. The CN 306 then forwards the request 320 and the global database snapshot to the DN 314. With the global database snapshot, the transaction 320 is made aware of the prior transaction 304 and the change committed by the transaction 304 is made visible to the transaction 320. Once the queried data records from DN 314 are retrieved, the result tuples that are visible to the second transaction 320 are sent back to the CN 306, which then forwards the tuples to the client 302.

Figure 4:
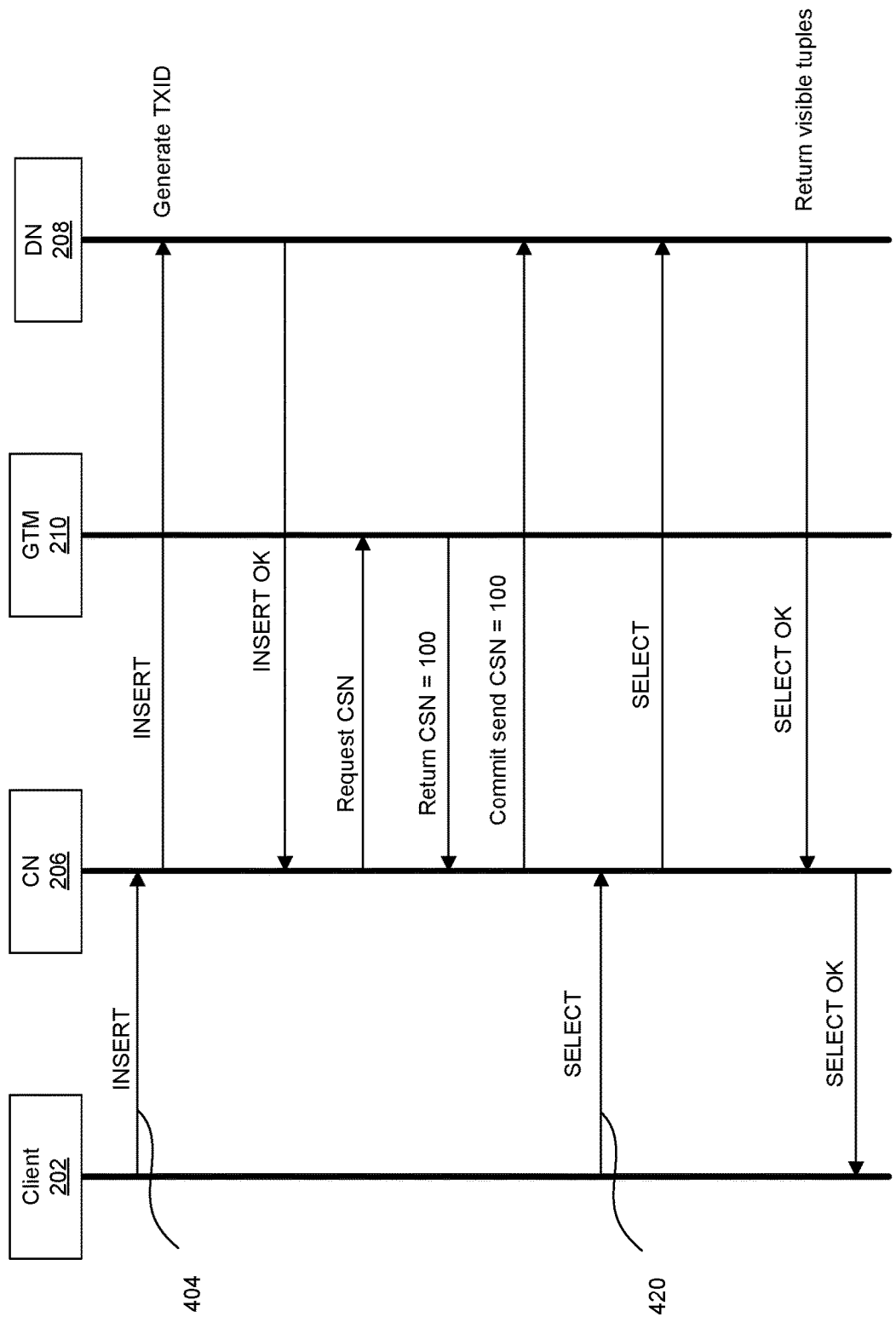
FIG. 4 illustrates a sequence diagram of processing single-shard transaction using a local database snapshot using an OLTP system having a GTM configured in a GTM-Lite mode in accordance with the present disclosure.

FIG. 4 illustrates a sequence diagram of an OLTP system having a GTM configured in a GTM-Lite mode processing a single-shard statement SELECT statement after a single-shard INSERT statement in accordance with the present disclosure. A transaction 404 comprising a single-shard INSERT statement is received at a CN 206 from a client 202. Without the need for GTM-Lite mode to generate a local transaction ID, the transaction 404 is forwarded directly to a DN 208 associated with the transaction which generates and assigns a TXID to the transaction by the DN 208. Responsive to receiving a readiness confirmation from the DN 208, the CN 206 contacts the GTM 210 for a CSN. The GTM 210 then assigns a CSN with a value of 100. The assigned CSN value of 100 is sent to the CN 206 from the GTM 210. With the CSN assigned, the CN 206 commits the change (e.g., the data contained in the INSERT statement) to the DN 208 with the corresponding CSN. A subsequent transaction 420 comprising a SELECT statement is received at the CN 206. Having determined that the statement is a single-shard read statement that references only the DN 208, the transaction 420 is forwarded to the DN 208 directly as no transaction ID or global database snapshot is required from the GTM 210. Upon receiving the transaction 420, a local database snapshot of the DN 208 is generated. With the local database snapshot, the transaction 420 is made aware of the prior transaction 404 and the change committed by the transaction 404 is made visible to the transaction 420. Once the queried data records from DN 308 are retrieved, the result tuples that are visible to the second transaction 420 are sent back to the CN 206, which then forwards the tuples to the client 202.

As may be discerned from FIGS. 3 and 4, using a local database snapshot and locally generated transaction identifiers, network communication, particularly between the CN and GTM, may be reduced for single-shard statements. However, due at least in part to the limited scope of local database snapshots, single-shard statements using local database snapshots may result in visibility anomalies of committed changes responsive to use in conjunction with multi-shard statements.

Figure 5B:
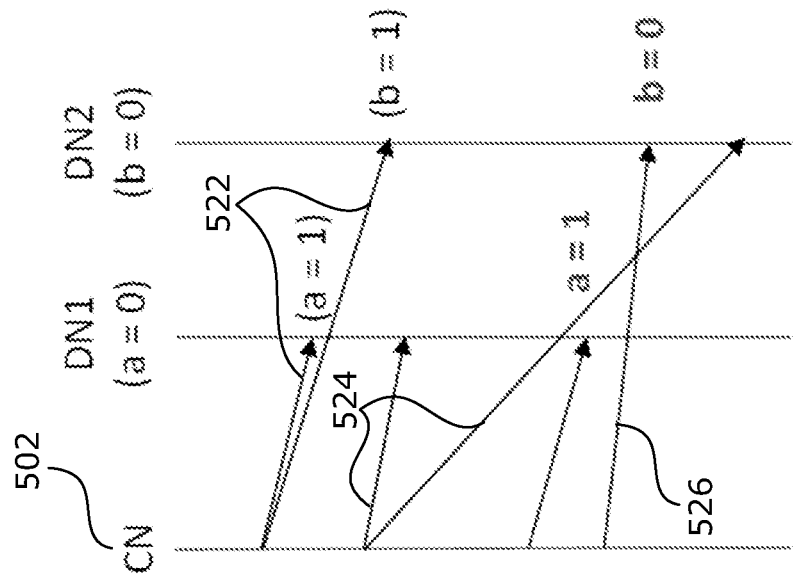
FIGS. 5A and 5B illustrate simplified sequence diagrams of two hypothetical scenarios where potential visibility anomalies may occur in a system that simply combines conventional multi-shard queries using global database snapshots and conventional single-shard queries using local database snapshots.
Figure 5A:
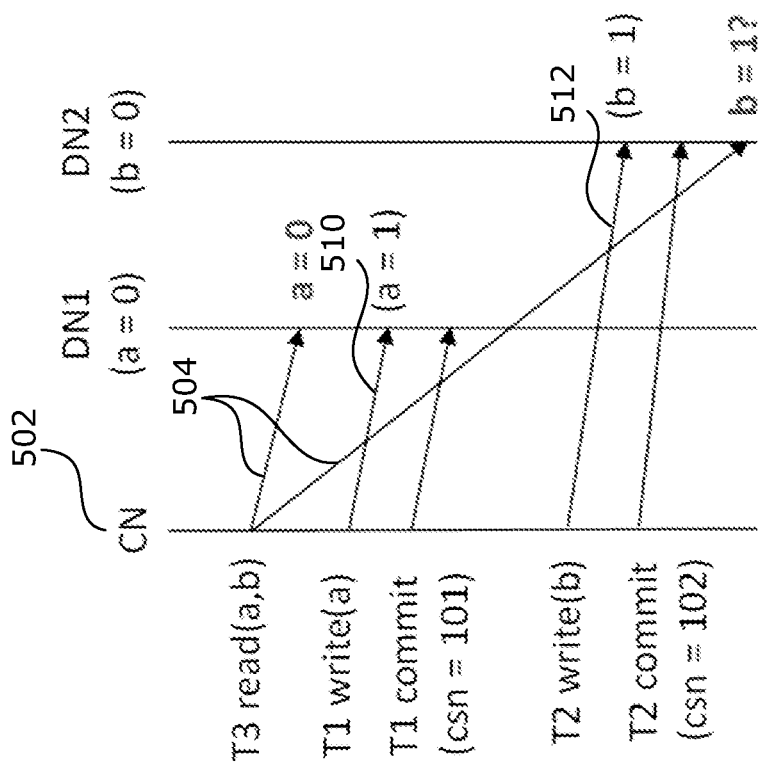

FIGS. 5A and 5B illustrate simplified sequence diagrams of two hypothetical scenarios where visibility anomalies may occur during the processing of read statements responsive to multi-shard statements using global database snapshots and single-shard statements using local database snapshots being simply combined in conventional OLTP systems. It is understood that FIGS. 5A and 5B are for purposes of illustrating the scenarios that could lead to anomalies and one or more steps in the sequence of communication may be omitted for brevity.

As shown in FIG. 5A, a CN 502 receives a transaction T3 including a multi-shard read statement 504 (i.e., SELECT) to access data records a and b from respective data nodes DN1 and DN2. The CN 502 is responsible for processing the transaction T3. The data records a and b each have an initial value of 0. Being multi-shard, the read statement 504 obtains a global database snapshot with database snapshot CSN of 100. As shown in FIG. 5A, the read statement 504 arrives on time at DN1 but arrives with a delay at DN2. During transit of the read statement 504 to DN2, two transactions T1 and T2 are received at the CN 502. Transactions T1 and T2, with respective local database snapshot CSNs of 101 and 102, are configured to commit respective changes to the values of the data records a and b in DN1 and DN2 with single-shard write statements (i.e. UPDATE or DELETE).

At DN1, as the write statement 510 and the subsequent commit from transaction T1 arrives in the correct temporal order with respect to transaction T3. Therefore, no visibility anomaly arises as transaction T3 is able to correctly read the value of a=0 and the value of data record a is subsequently changed to a=1 as committed by transaction T1.

However, an anomaly arises at DN2 where the change of b=1 committed by transaction T2 in statement 512 arrives before the read statement 504 from transaction T3 despite transaction T3 being received by the system before transaction T2. In this scenario, transaction T3 should read the value b=0. However, due to the late arrival of the statement 504 at DN2 and that transaction T2 uses a local database snapshot that is not aware of the pending transaction T3, transaction T3 could potentially read b=1.

In FIG. 5B, the CN 502 receives a transaction T3 including a multi-shard write statement 520 (i.e., INSERT, UPDATE or DELETE) for committing changes to the values of data records a and b is received by CN 502. As in FIG. 5A, the data record a in DN1 and data b in DN2 each has an initial value of 0. The CN 502, as part of the two-phase commit protocol used for the multi-shard statements, sends a PREPARE TO COMMIT statement 522 to the associated DNs: DN1 and DN2. Upon receiving a readiness confirmation from both DN1 and DN2, the CN 502 sends a COMMIT statement 524 to DN1 and DN2. As shown in FIG. 5B, the COMMIT statement 524 arrives on time at DN1 but arrives with a delay at DN2. During the transit of the COMMIT statement 524 to DN2, two transactions T1 and T2 are received at the CN 502. The two transactions T1 and T2 are single-shard read statements that attempt to access data records a and b, respectively.

At DN1, the write commit 524 from the multi-shard statement in the transaction T3 arrives before the read statement from transaction T1. In this case, no visibility anomaly arises when the transaction T3 commits the change for data record a from 0 to 1, and the subsequently received transaction T1 reads the value of data record a as 1.

However, an anomaly arises at DN2 where the change of b=1 committed by transaction T3 in write commit 524 arrives after the read statement 526 from transaction T2 despite the transaction T3 being received prior to the transaction T2. In this scenario, the transaction T2 should read the value b=1 as committed by a prior transaction T3. However, due to the late arrival of the commit request 524 and the limited scope of the local database snapshot used by transaction T2, transaction T2 could potentially read b=0.

Figure 6A:
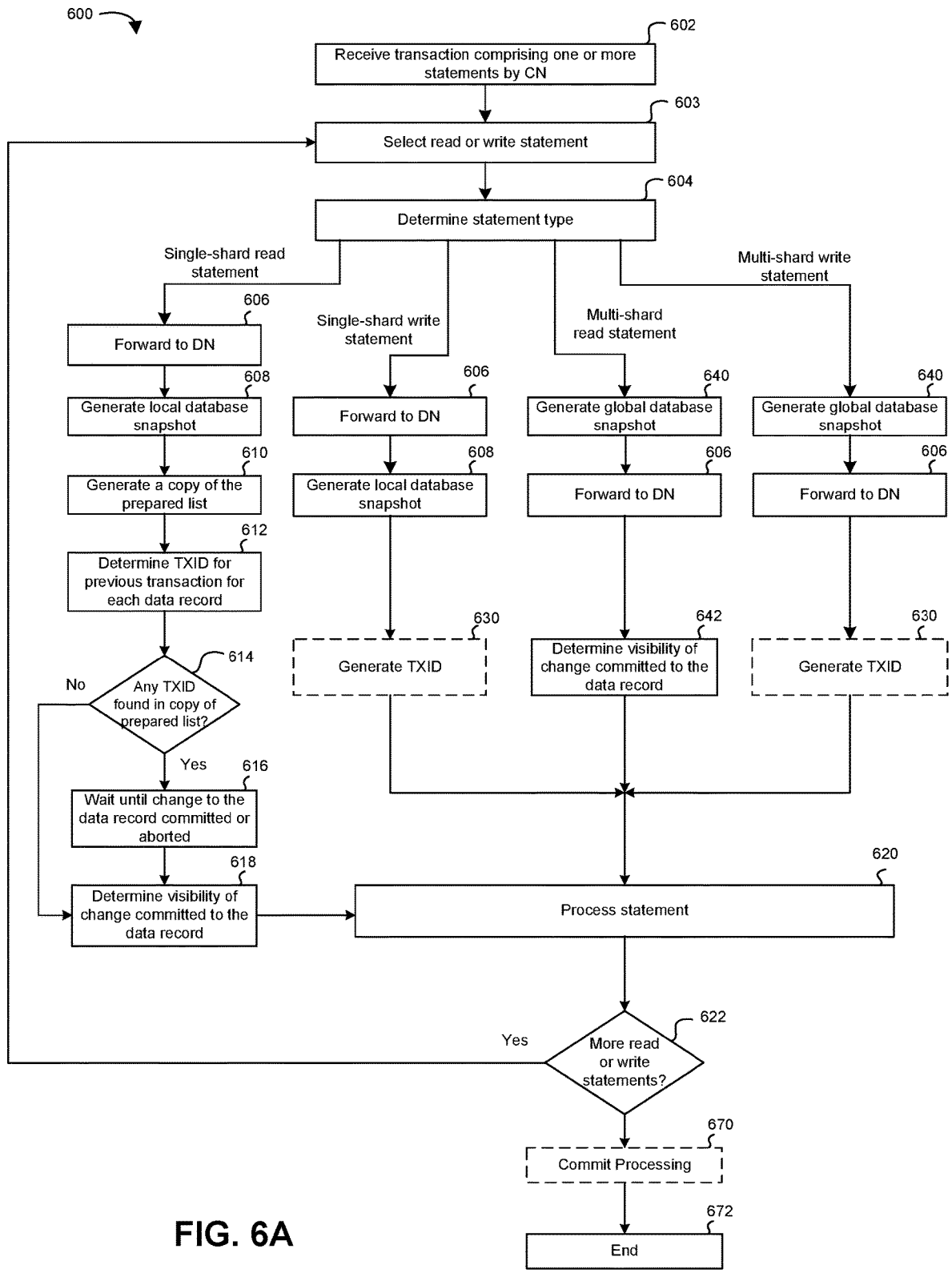
FIG. 6A illustrates a flowchart of a method of processing database transactions in accordance with an exemplary embodiment of the present disclosure.
Figure 6B:
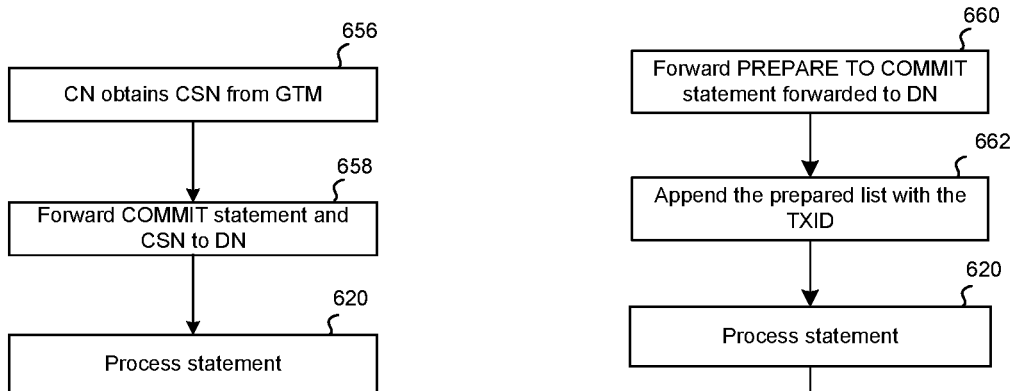
FIG. 6B illustrates a flowchart of commit processing for a single-shard write transaction in accordance with an exemplary embodiment of the present disclosure.
Figure 6C:
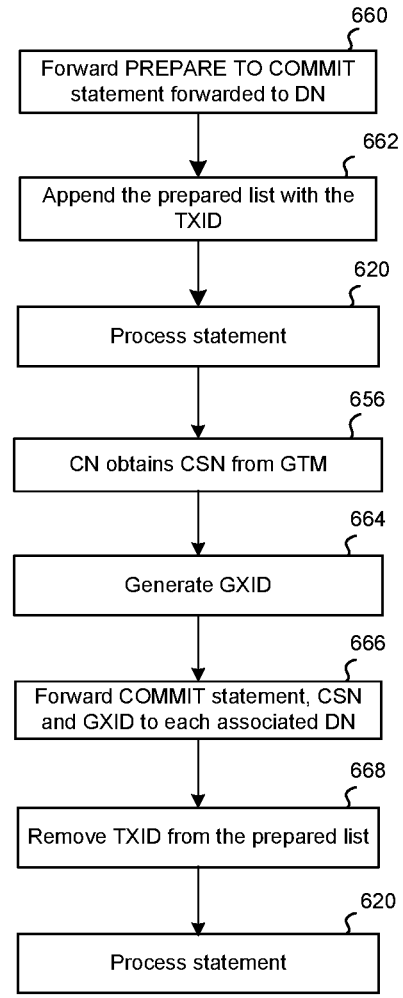
FIG. 6C illustrates a flowchart of commit processing for a multi-shard write transaction in accordance with an exemplary embodiment of the present disclosure.

FIGS. 6A to 6C illustrate a flowchart of a method 600 of processing database transactions in accordance with an exemplary embodiment of the present disclosure. The method 600 may be implemented by an OLTP system for maintaining an OLTP database such as an OLTP DMBS. The OTLP system comprises a GTM operating in a GTM-Lite mode, a plurality of coordinator nodes (CNs) and a plurality of data nodes. At least parts of the method 600 are carried out by software executed by the processing units(s) 102 of a computing device 100.

At step 602, a query comprising a transaction is received at a CN 206. The transaction comprises one or more statements, each statement references one or more data nodes for the statement to access. Each statement may be a read or write statement.

At step 603, when there is more than one statement in the transaction, a statement is selected from the transaction based on the order of the statements.

At step 604, the CN 206 determines a type of the statement. For example, the CN 206 determines whether the statement is a single-shard read statement, single-shard write statement, a multi-shard read statement or a multi-shard write statement based on the type of statement and the DNs 208 referenced by the data records in the statement. As noted above, statements referencing a single DN are single-shard statements and statements those referencing two or more DNs are multi-shard statements. The determination may be made, for example, by a database compiler (not shown) of the CN 206 compiling the one or more statements of the transaction.

At step 606, responsive to a determination that a statement is a single-shard read statement, the CN 206 sends the statement to the DN 208 referenced by the statement (e.g., the DN associated with the statement).

At step 608, the DN 208 generates a local database snapshot. The local database snapshot captures the state of the DN 208 at that time.

At step 610, the DN 208 generates a copy of the prepared list. The copy of the prepared list is static and is not updated with subsequently received TXIDs. Therefore, the copy of the prepared list only contains the TXIDs of the transactions that have been PREPARED TO COMMIT at the DN 208 before the current single-shard read statement.

At step 612, the DN 208 determines a TXID associated with each data record in the one or more data records referenced by the statement by reading the referenced records.

At step 614, the DN 208 determines whether the TXID of a previous transaction associated with any data record in the current transaction matches any of the TXIDs in the copy of the prepared list.

At step 616, responsive to a determination that the TXID of a previous transaction associated with a data record in the current transaction matches a TXID in the copy of the prepared list, the current transaction is caused to wait until the previous transaction in the copy of the prepared list that is also accessing the same data record has been either committed or aborted.

At step 618, after the previous transaction has been either committed or aborted, the DN 208 determines the visibility of any changes committed by the previous transaction associated with the data record to the current transaction by comparing the local database snapshot CSN associated with the current transaction against a local database snapshot CSN of the previous transaction associated with the data record. Should the local database snapshot CSN associated with the current transaction be of a higher value, in other words later priority, the previously committed change is made visible to the current transaction. If not, the previously committed change is made invisible to the current transaction.

At step 620, the current statement is allowed to proceed and the current statement is processed, with the visibility of any changes committed by the previous transaction to the current transaction depending on the result of step 616. Returning to step 614, responsive to a determination that the TXID of a previous transaction associated with a data record in the current transaction does not match any of the TXIDs in the copy of the prepared list, processing also proceeds to step 618 at which the visibility of any changes committed by the previous transaction associated with the data record to the current transaction is determined.

At step 622, it is determined whether any read or write statements in the transaction remain to be processed. If so, processing returns to step 603. If not, the method proceeds to step 670 at which commit processing optionally occurs (when the transaction includes a single-shard or multi-shard write statement), after which the method ends at 672.

Returning to step 604, responsive to a determination that a statement is a single-shard write statement, steps 606-610 are performed as described above for a single-shard read statement. Next, at step 630, the DN 208 generates a TXID for the current transaction when the statement is the first statement in the current transaction. Subsequent statements in the current transaction are associated with the same TXID. Next, the statement is processed at step 620. Next, at step 622, it is determined whether any read or write statements in the transaction remain to be processed. If so, processing returns to step 603. If not, the method proceeds to step 670 at which commit processing optionally occurs (when the transaction includes a single-shard or multi-shard write statement), after which the method ends at 672.

FIG. 6B illustrates the commit processing for a single-shard write transaction in accordance with an exemplary embodiment of the present disclosure. After the last read or write statement in the single-shard write transaction has been processed, a one-phase COMMIT process is performed. At step 656, the CN 206 responsible for processing the transaction requests a CSN from the GTM 210. The GTM 210 then returns a CSN to the CN 206. At step 658, the CN 206 sends a COMMIT statement and the CSN to the DN 208. The COMMIT statement is then received and processed by the DN 208 at step 620. During the processing of the COMMIT statement at step 620, the DN 208 updates the associated data records in the DN 208 and updates the local mapping between the CSN and the TXIDs for data records stored in the DN 208.

Returning to step 604, responsive to a determination that a statement is a multi-shard read statement, the CN 206 requests a global local database snapshot from the GTM 210 at step 640. The global database snapshot captures the state of the DNs 208 of the system 200 at that time. The GTM 210 sends the global database snapshot to the CN 206, which in turn forwards the global database snapshot to the referenced DNs 208. Next, the CN 206 sends the statement to each DN 208 referenced by the statement (e.g., the DN associated with the statement) at step 606.

At step 642, the DN 208 determines the visibility of any changes committed by the previous transaction associated with the data record to the current transaction by comparing the global database snapshot CSN associated with the current transaction against a global database snapshot CSN of the previous transaction associated with the data record. Should the global database snapshot CSN associated with the current transaction be of a higher value, in other words later priority, the previously committed change is made visible to the current transaction. If not, the previously committed change is made invisible to the current transaction.

At step 620, the current statement is allowed to proceed and the current statement is processed, with the visibility of any changes committed by the previous transaction to the current transaction depending on the result of step 642. Next, at step 622, it is determined whether any read or write statements in the transaction remain to be processed. If so, processing returns to step 603. If not, the method proceeds to step 670 at which commit processing optionally occurs (when the transaction includes a single-shard or multi-shard write statement), after which the method ends at 672.

Returning to step 604, responsive to a determination that a statement is a multi-shard write statement, the CN 206 requests a global local database snapshot from the GTM 210 at step 640. Next, the CN 206 sends the statement to each DN 208 referenced by the statement (e.g., the DN associated with the statement) at step 606.

Next, at step 630 each referenced DN 208 generates a TXID for the current transaction when the statement is the first statement in the current transaction. Subsequent statements in the current transaction are associated with the same TXID.

Next, the statement is processed at step 620. Next, at step 622, it is determined whether any read or write statements in the transaction remain to be processed. If so, processing returns to step 603. If not, the method proceeds to step 670 at which commit processing optionally occurs (when the transaction includes a single-shard or multi-shard write statement), after which the method ends at 672.

FIG. 6C illustrates the commit processing for a multi-shard write transaction in accordance with an exemplary embodiment of the present disclosure. After the last read or write statement in the multi-shard write transaction has been processed, a two-phase COMMIT process is performed. At step 660, the CN 206 responsible for processing the transaction sends a PREPARE TO COMMIT statement to the DN 208, which receives the PREPARE TO COMMIT statement. At step 662, the DN 208 adds, or appends, the TXID of the current transaction to the prepared list maintained by the respective DN 208. At step 620, the DN 208 then processes the PREPARE TO COMMIT statement in the usual way. At step 656, the CN 206 responsible for processing the transaction then requests a CSN from the GTM 210. The GTM 210 then returns a CSN to the CN 206. Next, at step 664, the CN 206 generates a GXID for the multi-shard write transaction. Next, at step 666 the CN 206 sends a COMMIT statement, the CSN and the GXID to each associated DN 208. The COMMIT statement is received by each associated DN 208 at step 620. At step 666, the DN 208 removes the TXID of the current transaction from the prepared list maintained by the respective DN 208. Next, at step 620, the DN 208 then processes the COMMIT statement in the usual way. During the processing of the COMMIT statement at step 620, the associated DNs 208 update the associated data records stored in the respective DN 208, update the local mapping between the CSN and the TXIDs for data records stored in the respective DN 208, and update the local mapping between the TXID and the corresponding GXID for data records stored in the respective DN 208.

The steps (also referred to as operations) in the flowcharts and drawings described herein are for purposes of example only. There may be many variations to these steps/operations without departing from the teachings of the present disclosure. For instance, the steps may be performed in a differing order, or steps may be added, deleted, or modified, as appropriate.

General

Through the descriptions of the preceding embodiments, the present invention may be implemented by using hardware only, or by using software and a necessary universal hardware platform, or by a combination of hardware and software. The coding of software for carrying out the above-described methods described is within the scope of a person of ordinary skill in the art having regard to the present disclosure. Based on such understandings, the technical solution of the present invention may be embodied in the form of a software product. The software product may be stored in a non-volatile or non-transitory storage medium, which can be an optical storage medium, flash drive or hard disk. The software product includes a number of instructions that enable a computing device (personal computer, server, or network device) to execute the methods provided in the embodiments of the present disclosure.

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present disclosure as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present invention and its advantages have been described in detail, it should be understood that various changes, substitutions and alterations can be made herein without departing from the invention as defined by the appended claims.

The present invention may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of processing database transactions, the method comprising:
 receiving, at a coordinator node, a query for a transaction comprising one or more statements;
 at a data node comprising one or more data records referenced in a single-shard read statement in the transaction:
  receiving, from the coordinator node, the single-shard read statement;
  generating a local database snapshot and a copy of a prepared list, wherein the prepared list comprises a list of transactions having one or more multi-shard write statements that have been prepared but not been committed, wherein transactions in the prepared list are identified by a respective local transaction identifier (TXID);

determining, for each data record in the one or more data records, a TXID of a previous transaction associated with each data record in the one or more data records referenced in the single-shard read statement;

determining, for each data record in the one or more data records, whether a transaction associated the data record is present in the copy of the prepared list by comparing the TXID of the previous transaction to the TXIDs in the copy of the prepared list to determine if a match exists;

responsive to a determination that one or more data records in referenced in the single-shard read statement are present in the copy of the prepared list, causing the single-shard read statement to await processing until all matching transactions identified in the prepared list are either committed or aborted;

determining a visibility of one or more committed changes to the one or more data records referenced in the single-shard read statement upon all matching the transactions identified in the prepared list being either committed or aborted; and processing the single-shard read statement based on the determined visibility of the one or more committed changes to the one or more data records referenced in the single-shard read statement.

2. The method of claim 1, further comprising:
responsive to a determination that one or more data records referenced in the single-shard read statement are not present in the copy of the prepared list transactions, allowing the single-shard read statement to be processed.

3. The method of claim 1, further comprising:
responsive to a determination that one or more data records referenced in the statement are not present in the copy of the prepared list, processing the single-shard read statement.

4. The method of claim 1, wherein the single-shard read statement is one of a single-shard SELECT statement or a single-shard QUERY statement.

5. The method of claim 1, wherein determining the visibility comprises:
comparing a local database snapshot Commit Sequence Number (CSN) against a CSN of the corresponding transaction identified in the copy of the prepared list;
wherein the one or more committed changes to the one or more data records in the one or more data records referenced in the single-shard read statement are made visible when the CSN of the corresponding transaction identified in the copy of the prepared list is less than the local database snapshot CSN;
wherein the one or more committed changes to the one or more data records in the one or more data records referenced in the single-shard read statement are made invisible when the CSN of the corresponding transaction identified in the copy of the prepared list is greater than the local database snapshot CSN.

6. The method of claim 1, further comprising:
at a data node comprising one or more data records referenced in a single-shard write statement in the transaction:
receiving the single-shard write statement from the coordinator node;
receiving a global database snapshot from the coordinator node; and
processing the single-shard write statement.

7. The method of claim 6, further comprising:
at the data node comprising one or more data records referenced in the single-shard write statement in the transaction:
generating a TXID for the transaction responsive to the single-shard write statement being a first write statement in the transaction.

8. The method of claim 6, wherein the single-shard write statement is one of an INSERT statement, UPDATE statement or DELETE statement.

9. The method of claim 6, further comprising:
responsive to the transaction being a single-shard write transaction:
after the last read or write statement in the single-shard write transaction has been processed, performing a one-phase COMMIT process comprising:
at the data node comprising one or more data records referenced in the single-shard write statement in the single-shard write transaction:
receiving, from the coordinator node, a COMMIT statement and a CSN for the transaction; and
processing the COMMIT statement.

10. The method of claim 1, further comprising:
at a data node comprising one or more data records referenced in a multi-shard read statement in the transaction:
receiving the multi-shard read statement from the coordinator node;
receiving a global database snapshot from the coordinator node;
determining a visibility of one or more committed changes to the one or more data records referenced in the multi-shard read statement; and
processing the multi-shard read statement based on the determined visibility of the one or more committed changes to the one or more data records referenced in the multi-shard read statement.

11. The method of claim 10, wherein determining the visibility of one or more committed changes to the one or more data records referenced in the multi-shard read statement comprises:
comparing a global database snapshot CSN against a CSN of the corresponding transaction identified in the copy of the prepared list;
wherein the one or more committed changes to the one or more data records in the one or more data records referenced in the multi-shard read statement are made visible when the CSN of the corresponding transaction for the data record is less than the global database snapshot CSN;
wherein the one or more committed changes to the one or more data records in the one or more data records referenced in the multi-shard read statement are made invisible when the CSN of the corresponding transaction for the data record is greater than the global database snapshot CSN.

12. The method of claim 11, wherein the multi-shard statement read statement is one of a multi-shard SELECT statement or a multi-shard QUERY statement.

13. The method of claim 1, further comprising:
at a data node comprising one or more data records referenced in a multi-shard write statement in the transaction:
receiving the multi-shard write statement from the coordinator node;
receiving a global database snapshot from the coordinator node; and
processing the multi-shard read statement.

14. The method of claim 13, further comprising:
at the data node comprising one or more data records referenced in the multi-shard write statement in the transaction:
generating a TXID for the transaction responsive to the multi-shard write statement being a first write statement in the transaction.

15. The method of claim 13, further comprising:
responsive to the transaction being a multi-shard write transaction:
after the last read or write statement in the multi-shard write transaction has been processed, performing a two-phase COMMIT process comprising:
at the data node comprising one or more data records referenced in the multi-shard write statement in the multi-shard write transaction:
receiving a PREPARE TO COMMIT statement from the coordinator node;
appending the prepared list with the TXID for the transaction responsive to receiving the PREPARE TO COMMIT statement;
processing the PREPARE TO COMMIT statement;
receiving, from the coordinator node, a COMMIT statement and a global transaction identifier (GXID) for the transaction and a CSN for the transaction;
removing the TXID from the prepared list responsive to receiving the COMMIT statement; and
processing the COMMIT statement.

16. The method of claim 15, wherein the multi-shard write statement is one of a multi-shard INSERT statement, multi-shard UPDATE statement or multi-shard DELETE statement.

17. The method of claim 1, wherein the database transaction relates to an online transaction processing (OLTP) database of an OLTP database management system (DBMS).

18. The method of claim 17, wherein the OLTP DBMA has a two-phase commit protocol for multi-shard write statements, the two-phase commit protocol comprising a prepare phase which uses a PREPARE TO COMMIT statement as a first phase and a commit phase which uses a COMMIT statement as a second phase.

19. A data node, comprising:
one or more processors configured to:
receive, from a coordinator node, a single-shard read statement, wherein the single-shard read statement is one statement in a transaction comprising one or more statements;
generate a local database snapshot and a copy of a prepared list, wherein the prepared list comprises a list of transactions having one or more multi-shard write statements that have been prepared but not been committed, wherein transactions in the prepared list are identified by a respective local transaction identifier (TXID);

determine, for each data record in the one or more data records, a TXID of a previous transaction associated with each data record in the one or more data records referenced in the single-shard read statement;
determine, for each data record in the one or more data records, whether a transaction associated the data record is present in the copy of the prepared list by comparing the TXID of the previous transaction to the TXIDs in the copy of the prepared list to determine if a match exists;
responsive to a determination that one or more data records in referenced in the single-shard read statement are present in the copy of the prepared list, cause the single-shard read statement to await processing until all matching transactions identified in the prepared list are either committed or aborted;
determine a visibility of one or more committed changes to the one or more data records referenced in the single-shard read statement upon all matching the transactions identified in the prepared list being either committed or aborted; and
process the single-shard read statement based on the determined visibility of the one or more committed changes to the one or more data records referenced in the single-shard read statement.

20. A non-transitory machine-readable medium having tangibly stored thereon executable instructions for execution by one or more processors of a data node, wherein the executable instructions, responsive to execution by the one or more processors, cause the data node to:
receive, from a coordinator node, a single-shard read statement, wherein the single-shard read statement is one statement in a transaction comprising one or more statements;
generate a local database snapshot and a copy of a prepared list, wherein the prepared list comprises a list of transactions having one or more multi-shard write statements that have been prepared but not been committed, wherein transactions in the prepared list are identified by a respective local transaction identifier (TXID);
determine, for each data record in the one or more data records, a TXID of a previous transaction associated with each data record in the one or more data records referenced in the single-shard read statement;
determine, for each data record in the one or more data records, whether a transaction associated the data record is present in the copy of the prepared list by comparing the TXID of the previous transaction to the TXIDs in the copy of the prepared list to determine if a match exists;
responsive to a determination that one or more data records in referenced in the single-shard read statement are present in the copy of the prepared list, cause the single-shard read statement to await processing until all matching transactions identified in the prepared list are either committed or aborted;
determine a visibility of one or more committed changes to the one or more data records referenced in the single-shard read statement upon all matching the transactions identified in the prepared list being either committed or aborted; and process the single-shard read statement based on the determined visibility of the one or more committed changes to the one or more data records referenced in the single-shard read statement.

\* \* \* \* \*